US011920899B2

(12) United States Patent
Squillace et al.

(10) Patent No.: US 11,920,899 B2
(45) Date of Patent: Mar. 5, 2024

(54) COLLABORATIVE COORDINATION OF TARGET ENGAGEMENT

(71) Applicant: Rosemount Aerospace Inc., Burnsville, MN (US)

(72) Inventors: Guy Squillace, Prior Lake, MN (US); Gary Willenbring, Waconia, MN (US); Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 97 days.

(21) Appl. No.: 17/578,322

(22) Filed: Jan. 18, 2022

(65) Prior Publication Data
US 2023/0228527 A1 Jul. 20, 2023

(51) Int. Cl.
*F41G 7/22* (2006.01)
*G01C 21/00* (2006.01)
*G06T 7/70* (2017.01)

(52) U.S. Cl.
CPC ......... *F41G 7/2253* (2013.01); *F41G 7/2233* (2013.01); *F41G 7/2293* (2013.01); *G01C 21/005* (2013.01); *G06T 7/70* (2017.01)

(58) Field of Classification Search
CPC .... F41G 7/2253; F41G 7/2233; F41G 7/2293; G01C 21/005; G06T 7/70–77
See application file for complete search history.

(56) References Cited

U.S. PATENT DOCUMENTS

| | | | |
|---|---|---|---|
| 7,286,624 B2 | 10/2007 | Woo et al. | |
| 7,947,936 B1 | 5/2011 | Bobinchak et al. | |
| 9,476,677 B1 | 10/2016 | Sierchio et al. | |
| 10,012,477 B1 | 7/2018 | Ell et al. | |
| 10,114,384 B2 | 10/2018 | Liu et al. | |
| 10,337,835 B2 | 7/2019 | Smith | |

FOREIGN PATENT DOCUMENTS

WO WO-2021257031 A1 * 12/2021

* cited by examiner

*Primary Examiner* — Matthew M Barker
(74) *Attorney, Agent, or Firm* — Locke Lord LLP; Scott D. Wofsy; Christopher J. Capelli

(57) ABSTRACT

A method for collaboration of a plurality of nodes includes determining at each node SLAM data for the node, the SLAM data including estimated position of features and/or targets observed and processed by the node using SLAM algorithms and covariance associated with the estimated positions, communicating at each node the node's SLAM data to the other nodes via each nodes' datalink communication system, receiving at each node SLAM data communicated from the other nodes via each node's datalink communication system, combining at each node the node's SLAM data and the SLAM data received from the other nodes based on features or targets included in SLAM data from the other nodes, refining at each node estimated positions of features and/or targets based on results of the combining, and navigating each node to a target at the target destination as a function of at least one of the refined estimated positions.

19 Claims, 5 Drawing Sheets

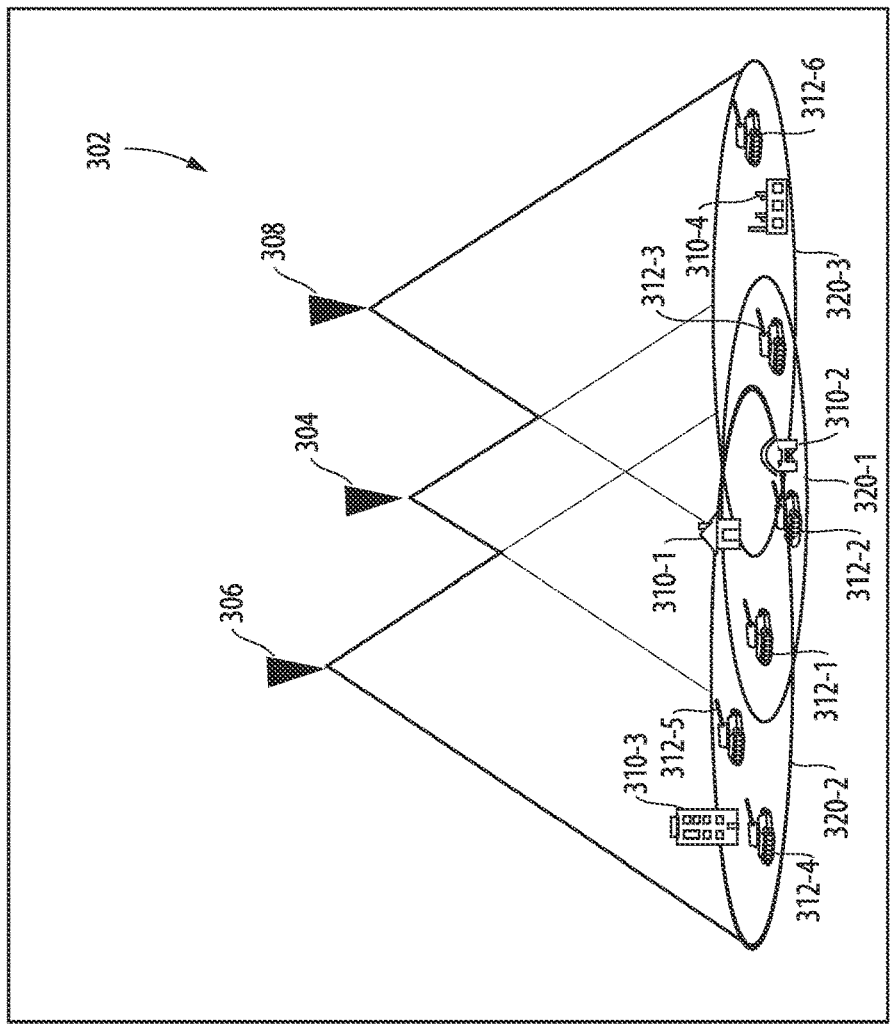
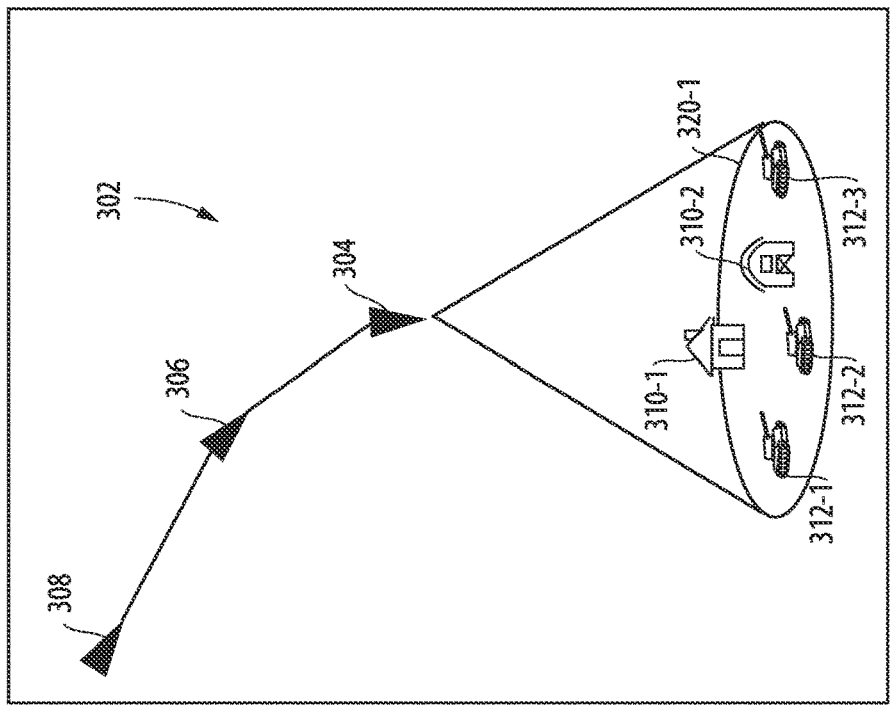
Fig. 3B
Fig. 3A

COLLABORATIVE COORDINATION OF TARGET ENGAGEMENT

FIELD OF THE DISCLOSURE

The disclosed embodiments generally relate to munitions, and more particularly, to collaborative coordination of target engagement by munitions.

BACKGROUND

When engaging one or more targets (e.g., ground targets), a salvo of multiple munitions can be used in a coordinated strike of the target(s). The salvo is often maneuverable and autonomous in flight. When respective munitions in the salvo are provided with a datalink, they are able to share positioning and targeting data for a coordinated engagement. The salvo of munitions communicating via the datalink may be used for coordinated target engagement in which each munition operates in the same spatial frame of reference. While earth centered earth fixed (ECEF) coordinates can be used as a global frame of reference, errors in navigation solutions for the respective munitions can misalign coordinate frames. Misalignment can interfere with synchronization of target sets and therefore can interfere with synchronization and coordination of target selection among the munitions of the salvo, which can result in missed targets and/or overkill of a target.

Thus, it is desirable to provide reduce, minimize, or eliminate misalignment of coordinate frames to aid in synchronization between munitions for coordinating target engagement.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for collaboration of a plurality of nodes travelling in a group to a target destination having one or more targets, wherein each node of the plurality of nodes is provided with a datalink communication system to communicate with other nodes of the plurality of nodes. The method includes determining at each node SLAM data for the node, the SLAM data including estimated position of features and/or targets observed by the node and processed by the node using SLAM algorithms and covariance associated with the estimated positions, communicating at each node the node's SLAM data to the other nodes via each nodes' datalink communication system, receiving at each node SLAM data communicated from the other nodes via each node's datalink communication system, combining at each node the node's SLAM data and the SLAM data received from the other nodes based on one or more features or targets included in SLAM data from two or more nodes of the other nodes, refining at each node estimated positions of features and/or targets based on results of the combining, and navigating each node to a target at the target destination as a function of at least one of the refined estimated positions.

In one or more embodiments, the method can further include combining at each node the node's own SLAM data, and the SLAM data received from the other nodes can include determining one or more features and/or targets for which positions are included in the node's SLAM data are the same one or more features and/or targets for which positions are included in the received SLAM data.

In one or more embodiments, the SLAM data determined at each node can further include meta data about the features and/or targets for which estimated positions are included, wherein the meta data can include at least one of a feature type, target type, target heading, direction of motion, and target speed.

In one or more embodiments, the method can further include capturing at each node one or more images, recognizing at each node one or more features or targets in the images, and tracking at each node the recognized one or more features or targets, wherein the node's SLAM data can be based on the tracked one or more features or targets.

In one or more embodiments, when traveling in the constellation, a first and second node of the plurality of nodes can determine their respective SLAM data substantially simultaneously followed by receiving each other's respective SLAM data, or wherein when traveling in the constellation the first node can determine its SLAM data and the first node can provide the first node's SLAM data to the second node before the second node determines the second node's SLAM data.

In one or more embodiments, the plurality of nodes can be a plurality of munitions in a salvo discharged to attack one or more targets.

In one or more embodiments, each munition of the plurality of munitions in the salvo can be selected from the group consisting of: gun launched munitions; rocket propelled munitions; motor propelled munitions; air dropped munitions; and Unmanned Aerial Vehicles.

In one or more embodiments, each of the nodes the SLAM data can be determined independent of a Global Positioning System (GPS).

In one or more embodiments, the method can further include communicating at each node navigation data of the node to the other nodes via each nodes' datalink communication system, and receiving at each node navigation data communicated from the other nodes via each node's datalink communication system, wherein the determining at each node the distance range of the node relative to the other nodes can be further performed using the navigation data communicated from the other nodes.

In one or more embodiments, the method can further include each node updating the node's SLAM data using navigation data of the node as the node travels.

In another aspect of one or more aspects of the disclosure, navigation system is provided for providing collaboration of a plurality of nodes travelling in a group to a target destination having one or more targets. The navigation system of each node of the plurality of nodes includes a datalink communication system configured and operable to communicate with other nodes of the plurality of nodes, a navigation component for navigating the node in travel, a memory configured to store instructions, and a processor disposed in communication with the memory. The processor upon execution of the instructions is configured to determine SLAM data for the node, wherein the SLAM data includes estimated position of features and/or targets observed by the node and processed by the node using SLAM algorithms and covariance associated with the estimated positions. The node's SLAM data is communicated to the other nodes via the nodes' datalink communication system. The SLAM data communicated from the other nodes is received via the other nodes' datalink communication systems. The node's SLAM data and the SLAM data received from the other nodes is combined based on one or more features or targets included in SLAM data from two or more nodes of the other nodes. The estimated positions of features and/or targets are refined based on results of the combining. The node is navigated to a target at the target destination as a function of at least one of the refined estimated positions.

In one or more embodiments, combining the node's SLAM data and the SLAM data received from the other nodes can include determining one or more features and/or targets for which positions are included in the node's SLAM data are the same one or more features and/or targets for which positions are included in the received SLAM data.

In one or more embodiments, the SLAM data determined can further include meta data about the features and/or targets for which estimated positions are included, wherein the meta data can include at least one of a feature type, target type, target heading, direction of motion, and target speed.

In one or more embodiments, the processor upon execution of the instructions can be further configured to capture one or more images, recognize one or more features or targets in the images, and track the recognized one or more features or targets, wherein the node's SLAM data can be based on the tracked one or more features or targets.

In one or more embodiments, when traveling in the constellation, the node and a second node of the plurality of nodes can determine their respective SLAM data substantially simultaneously followed by receiving each other's respective SLAM data, or wherein when traveling in the constellation the node can determine its SLAM data and the node provides the node's SLAM data to the second node before the second node determines the second node's SLAM data.

In one or more embodiments, the plurality of nodes can be a plurality of munitions in a salvo discharged to attack one or more targets.

In one or more embodiments, each munition of the plurality of munitions in the salvo can be selected from the group consisting of: gun launched munitions; rocket propelled munitions; motor propelled munitions; air dropped munitions; and Unmanned Aerial Vehicles.

In one or more embodiments, the SLAM data can be determined independent of a Global Positioning System (GPS).

In one or more embodiments, the processor upon execution of the instructions can be further configured to: communicate navigation data of the node to the other nodes via the node's datalink communication system, and receive at the node's datalink communication system navigation data communicated from the other nodes via the other nodes' datalink communication systems, wherein the determining the distance range of the node relative to the other nodes can be further performed using the navigation data communicated from the other nodes.

In one or more embodiments, the processor upon execution of the instructions can be further configured to: update the node's SLAM data using navigation data of the node as the node travels.

BRIEF DESCRIPTION OF THE DRAWINGS

So that those skilled in the art to which the subject disclosure appertains will readily understand how to make and use the devices and methods of the subject disclosure without undue experimentation, various illustrated embodiments thereof will be described in detail herein below with reference to certain figures, wherein:

FIGS. 3A and 3B illustrate a salvo of munitions in different scenarios sharing SLAM data while approaching a planned target destination, in accordance with one or more embodiments of the disclosure;

DETAILED DESCRIPTION OF CERTAIN EMBODIMENTS

Figure 1:
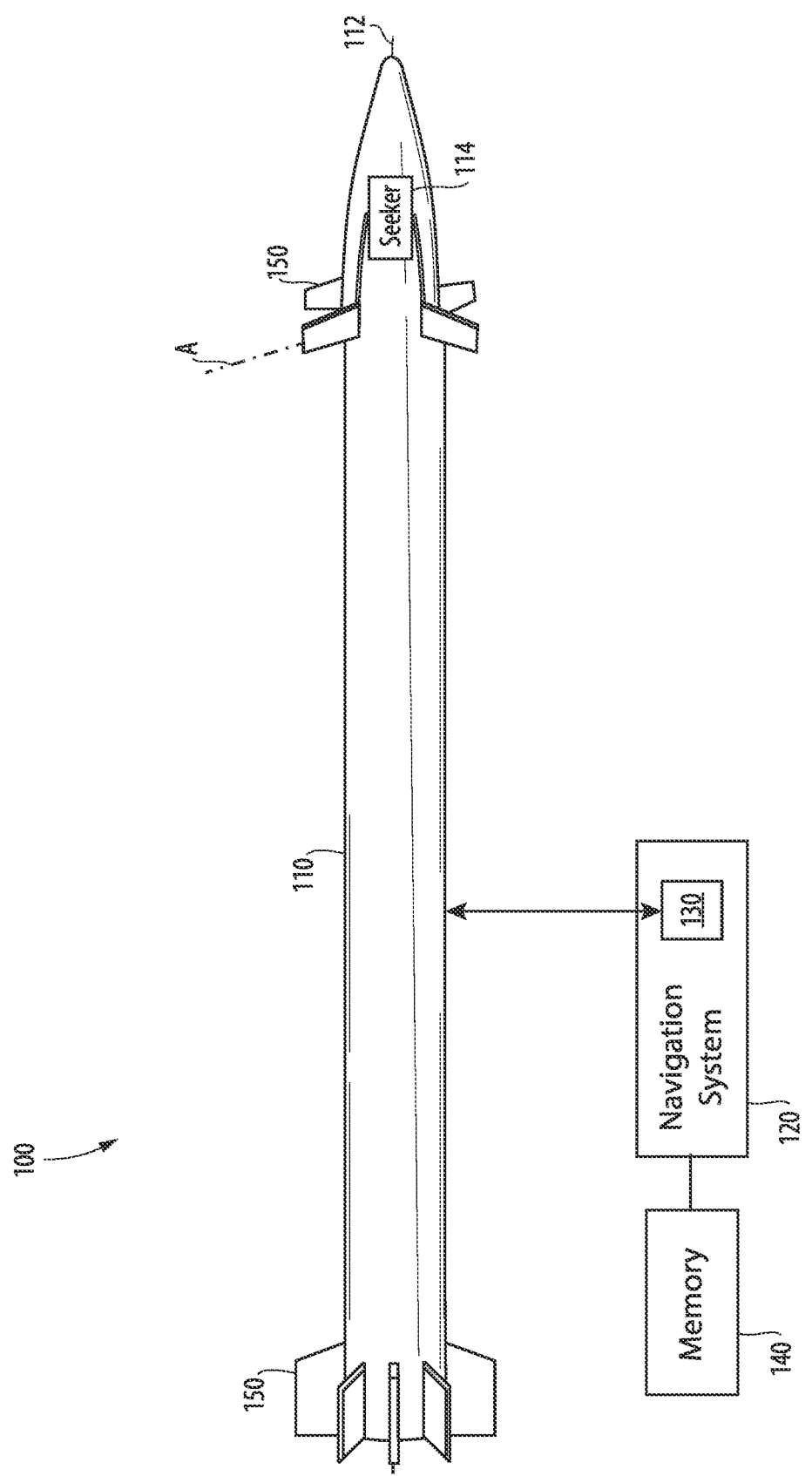
FIG. 1 illustrates a schematic diagram of an example munition projectile, in accordance with one or more embodiments of the disclosure.

Aspects of the disclosure are disclosed in the following description and related drawings directed to specific illustrated embodiments. Alternate embodiments may be devised without departing from the scope of the illustrated. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all illustrated embodiments include the discussed feature, advantage or mode of operation.

The terminology used herein is for the purpose of describing particular embodiments only and is not intended to be limiting of the illustrated embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Each munition in a salvo of munitions can use a data link to communicate with any other munition in the salvo that is in range of the data link. Each munition can develop an individual map with the munition localized in the map using simultaneous localization and mapping (SLAM). The munition is configured to include in its individual map positions (e.g., coordinates) and labels of stationary feature(s) on the ground that the munition can distinguish, once in view of its imager.

The munitions can share the feature positions and labels as map information via the data link with the other munitions of the salvo. Since the features are non-moving objects, using the map information received from other munitions, the munitions of the salvo can coordinate reference frames based on positions of the features and use a shared map. Since the features are viewed independently by the different munitions, added observability of the features can reduce covariance of the feature positions in the shared map, providing refined feature positions.

The refined feature positions in the shared map can be used to enhance navigation solutions of the individual munitions. As targets are detected by the individual munitions the targets can be added to the shared map, correlated to proximate features, and associated meta data can be shared for improving target correlation, each of which can improve collaborative target selection by the respective munitions.

With reference now to FIG. 1, shown is an exemplary embodiment of a munition 100 that is a suitable exemplary environment in which certain embodiments of the below described illustrated embodiments may be implemented. Munition 100 is configured to operate in a salvo of munitions. FIG. 1 is an example of a suitable environment and is not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

For instance, the munition 100 shown in FIG. 1 is depicted as a projectile 110 (as described below). However, a munition of the illustrated embodiments described herein is not to be limited to projectile 110 as shown, as it may encompass any suitable munition including, but not limited to: gun launched munitions; rocket propelled munitions; motor propelled munitions; air dropped munitions and Unmanned Aerial Vehicles. It is to thus be appreciated for ease of illustration, munition 100 is shown and described as a projectile 110 in FIG. 1. In one or more embodiments, munition 100 is a node of a plurality of nodes travelling in a group (e.g., a constellation), such as a plurality of aircraft, land or water bound vehicles or drones, robots, etc. Travel can include, for example flight, movement in water (above or below), and earthbound movement.

As shown in FIG. 1, munition 100 includes a navigation system 120 having at least one associated processor 130 operatively connected to a memory 140. Certain components of the navigation system 120 are described further below with reference to FIG. 2. It is to be appreciated and understood, the projectile 110 of FIG. 1 is configured and adapted to undertake the operations described below. For instance the projectile 110 may include a plurality of control surfaces 150, e.g., all-moving fins and fixed lifting surfaces with hinged control surfaces, configured to rotate about their respective deflection axes, e.g., axis A as shown, to generate control forces and moments. In one or more embodiments, a seeker 114 can be affixed to a nose portion 112 of projectile 110 and configured for recognizing a target.

Those skilled in the art will readily appreciate that navigation system 120 is disposed within projectile 110. Those skilled in the art will also readily appreciate that processor 130 may be any one of numerous known processors or an application specific processor that operates in response to program instructions. Processor 130 can comprise more than one distinct processing device, for example to handle different functions, e.g. different operations of the method described below. It is also contemplated that memory 140 can be any form of memory device, for example, volatile or non-volatile memory, solid state storage device, magnetic device, or the like. It will be appreciated that memory 140 may include either, or both, RAM (random access memory) and ROM (read only memory). It will be further appreciated that memory 140 could be integrally formed as part of processor 130.

Figure 2:
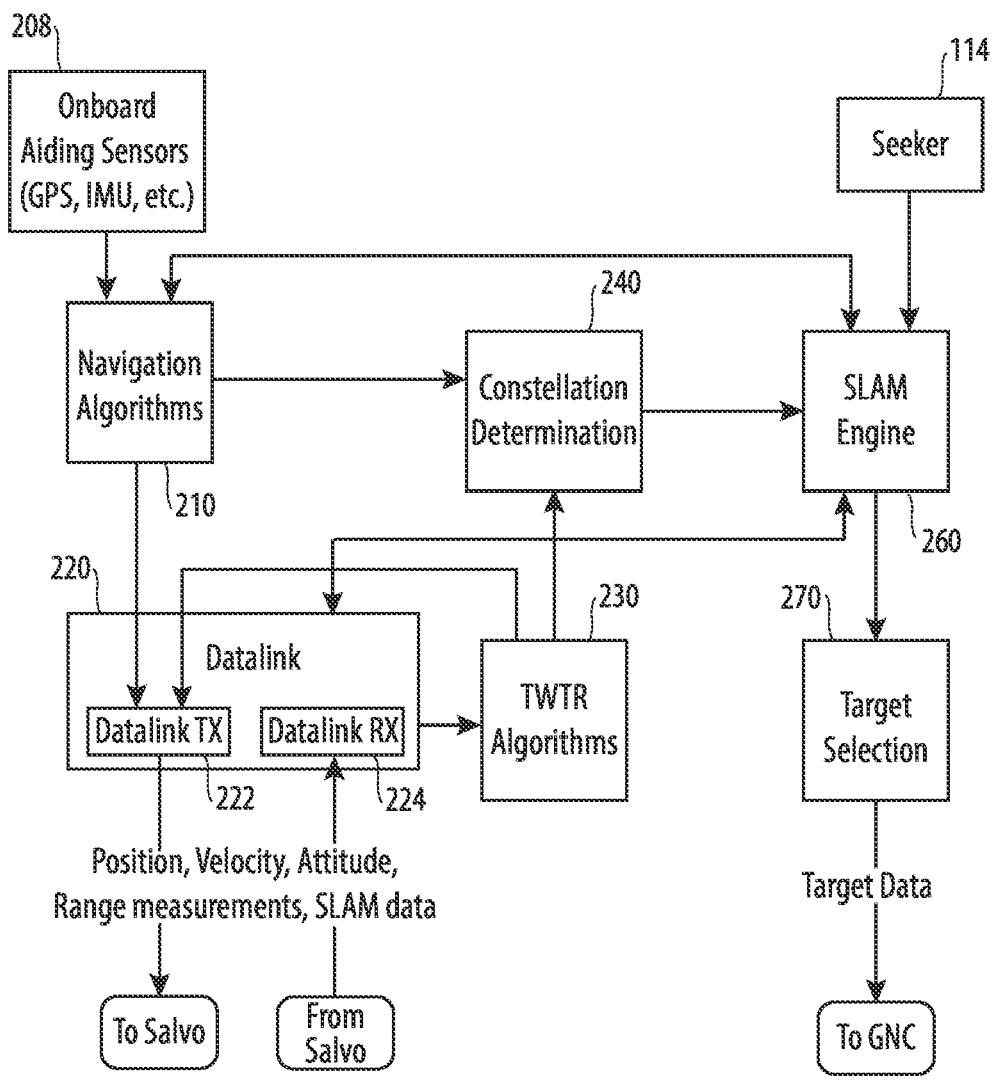
FIG. 2 illustrates a block flow diagram of an example navigation system utilized in a munition, in accordance with one or more embodiments of the disclosure.

In accordance with the certain illustrated embodiments, and with reference now to FIG. 2, navigation system 120 of a munition, such as munition 100 shown in FIG. 1, may include and/or be communicatively coupled to the components/software modules shown in FIG. 2, as now briefly described. Navigation system 120 includes a navigation component 210 for determining positioning of the munition while in flight. In particular, navigation component 210 is configured and operable such that a munition is able to estimate its position, velocity and attitude with covariance estimates using an Inertial Measurement Units (IMU) device, as well as any other navigation aiding solutions provided on a particular munition type with onboard aiding sensors 208. The covariance of the position, velocity, and attitude estimates and the measurement covariance (based on the expected accuracy or uncertainty (e.g., due to blurriness, resolution, etc.) of the location of a feature or target in the image) are used to determine covariance of features and targets in a map.

As readily understood by one of ordinary skill in the art, IMUs have been used in a wide variety of applications. For example, IMUs are commonly used in inertial guidance and navigation systems for all types of vehicles, in particular aircraft and spacecraft. Inertial navigation has the advantage of not being dependent on an external point of reference (e.g., GPS). Navigation is accomplished by sensing the motion of munition and calculating the change in position with respect to an initial position. An IMU device of onboard aiding sensors 208 is able to determine the three-dimensional orientation of munition 100 relative to a reference direction absolutely within an inertial system.

An example IMU may consist of three equal modules, each including a gyroscopic rotational rate sensor, a linear accelerometer, and associated electronics. Each module is typically oriented on a cube or a similar structure to provide inertial measurements along one of three orthogonal axes, with the gyroscopic rotational rate sensors providing information regarding rotation of the unit and the accelerometers providing information concerning linear movement of the unit. In this way, the IMU is able to determine the position of the vehicle with respect to the vehicle's initial position to aid in guidance, navigation, and control of the vehicle.

Three-axis inertial measurement units as described above have been used extensively in aerospace applications. Traditionally, such IMUs included mechanical sensors such as conventional spinning mass gyroscopes and large mechanical accelerometers. However, most current IMUs utilize microelectromechanical systems (MEMS) devices. Many MEMS sensors are mounted on a support substrate made of silicon or a similar material and can detect acceleration by measuring a change in capacitance. Current technologies using MEMS devices encapsulate the accelerometer, gyroscope, and associated electronics into individual packages. These packages are typically soldered to a circuit board, which is then mounted on one plane of an orthogonal assembly, such as a face of a cube.

Most inertial sensors, including MEMS sensors, are perpendicular sensors or out of plane devices, meaning that the sense axis of the device is oriented at a 90 degree angle with respect to the mounting plane. Some MEMS devices, including accelerometers and gyroscopes, are in-plane sensors. In-plane sensors are inertial sensors having a sense axis that is parallel to the mounting plane. In-plane sensors detect an acceleration or rotation along an axis parallel to the surface of the support substrate. Navigation component 210 can be configured to process the data from the IMU (also referred to as IMU data) to determine position, velocity, and attitude (also referred to as a navigation solution or navigation data) of the munition.

In accordance with the illustrated embodiments, navigation system 120 is provided with a datalink system 220 having a datalink transmitter 222 and a receiver 224 for providing direct two-way communication over a data link with other munitions in a traveling group of munitions (such as a salvo; see, for example munitions 304, 306, 308 in salvo 302 shown in FIG. 3A), each of the other munitions also having a compatible datalink system 220. While the example shown and described is a salvo of munitions, the disclosure is not limited to a salvo of munitions, but can refer to a group of nodes that travel together using a constellation that has a defined formation. As described further below, travel of a group of munitions, e.g., salvo 302 of munitions 304, 306, 308 shown in FIG. 3A, can be executed in a constellation having a formation based on formation data that was pre-loaded for each of the munitions. The formations can be different shapes, such as honeycomb, checkerboard, row/column, rectangle, etc.. The formation can have a flexible shape that merely requires a predefined distance between munitions.

Munitions within communication range with one another via their respective datalink systems 220 are enabled to communicate in real-time with each other so as to share and communicate navigation data (e.g., position coordinates, velocity, attitude and range measurements) with each other. In addition, Two-Way Timing and Ranging (TWTR) data as determined by a TWTR software module 230 provided in the navigation system 120 may be shared by the datalink system 220 of each of the munitions that are with communication range of one another. In addition, the munitions can share SLAM data, including a map, covariance data, and meta data. The map and meta data include initial and refined positions and labels of targets and features observed by a seeker (e.g., seeker 114 shown in FIG. 1) and velocities of any moving targets, using a common reference frame that can be based on a local reference frame or a global reference frame.

The reference frame to be used would be defined before launch of the munitions. For global reference frames, the data would be shared in the desired reference frame. For local reference frames, the reference frame can either be set by the munition with the earliest feature detection or each munition would be configured to determine a translation and rotation of the other nodes' respective reference frames with respect to its own.

The reference frames can be determined in one of two ways. The first way includes establishing a global reference frame before launch. For example, the software is written so that all munitions operate using ECEF or geodetic coordinates. The second way includes each of the munitions establishing, autonomously and in real time, a local reference frame based on the observed, stationary features. In other words, the features used by a particular munition for its local reference frame cannot be part of a body frame of the munition. When establishing a local reference frame, a munition can use a first feature detected to be the origin. A second feature (also referred to as an alignment feature) is used to establish an axis of the coordinate system to give orientation. For example, a warehouse is determined to be the origin of the reference frame and a road intersection is determined to be xx meters along the x axis from the origin.

A common reference frame for all of the munitions can use a global reference frame or overlapping local reference frames. When using overlapping local reference frames, sufficient overlap is needed of the maps and FOV of the munitions to assure the maps and FOV of each of the munitions include the same origin and alignment feature. Meta-data about the features can also help with alignment of the maps for creating the common reference frame. For example, an L-shaped building can be used to determine relative orientation of the munitions based on how the L is viewed.

TWTR module 230 of a munition is operable to estimate ranges between the munition (e.g., munition 304 of FIG. 3A) and other munitions in the same salvo (e.g., munitions 306 and 308 within salvo 302, FIG. 3A) based on data received via its datalink RX 224. Thus, in accordance with the illustrated embodiments it is to be appreciated that each munition is equipped with a TWTR module 230 that applies TWTR algorithms operable to estimate the range between itself and other munitions in its salvo and to share TWTR data via datalink system 220 to synchronize its clock signals with clock signals output by the other munitions.

In one or more embodiments, navigation system 120 of the munition further includes a constellation determination software module 240 which is operable to utilize the munitions navigation solutions determined by the navigation component 210, in conjunction with data received via datalink RX 224 from other munitions in the same salvo. The data received from the other munitions in the salvo includes navigation solutions determined by navigation components 210 of the respective other munitions from the corresponding munition's IMU data and other aiding sensors, if available. In one or more embodiments, the data received from the other munitions can further include TWTR data determined by and provided from TWTR module 230 of the respective other munitions.

Constellation determination software module 240 of the munition (e.g., munition 302 of FIGS. 3A and 3B) is configured to determine an estimated position of the other munitions (e.g., munitions 304, 306 of FIGS. 3A and 3B) in salvo (e.g., salvo 302 of FIGS. 3A and 3B) that are within communication range, and a distance range to them. This enables the navigation system 120 of the munition to establish its position relative to other munitions in the salvo. A constellation of the munitions is can be first defined by the relative positions, e.g., in body frame coordinates, with the processing munition being at the origin. Each munition can have its own calculation of the constellation in its own body frame coordinates (which for a munition can be an x-axis that points out the nose, a y-axis that points out a right side of the fuselage, and a z-axis that points out a bottom of the fuselage. The constellation can be resolved in a local navigation frame (such as North, East, Down coordinates) using the estimated attitude of the munition and the position estimates of the munitions that have been resolved in the local frame and received via the data link.

The constellation can also be resolved into a global frame by taking estimated global positions (such as latitude, longitude, altitude) of the munition and resolving its local frame into the global frame (which can be done, for example, using rotation matrices).

Seeker 114 can be affixed to or incorporated into munition, such as at its nose portion (e.g., nose portion 112 of projectile 110 shown in FIG. 1). Seeker 114 includes at least one imager (e.g., a camera (sensitive to infrared and/or visible light), radar, or similar sensor) having a field of view (FOV) that captures images, identification software for recognizing features and targets in the FOV, and tracking software for tracking the features and targets in the captured images as the munition approaches a target destination and as the target moves, if mobile. Seeker 114 outputs seeker data that includes estimated feature and target positions, velocities of moving targets, and labels that can identify and indicate a type of recognized features or targets. The positions are based on a local reference frame.

SLAM engine 260 is communicatively coupled to navigation component 210 for receiving a navigation solution, to constellation module 240 for receiving relative positions of the munition relative to the other munitions, and to seeker 114 for receiving seeker data. SLAM engine 260 applies the navigation solution, relative position data, and seeker data to SLAM algorithms for building a map of the environment in a selected reference frame. The reference frame can be selected by the user or the software. The map is combination of SLAM data for different features and targets.

SLAM engine 260 also receives SLAM data from the other munitions in the salvo. Using the SLAM data from the other munitions in the salvo, in addition to the navigation solution, relative position data, and seeker data, SLAM engine 260 determines refined SLAM data (including positions and labels of the targets and features and velocities of any moving targets) in the global reference frame that is common to the munitions of the salvo. SLAM engine 210 can build the map to include notable, stationary features observed in its environment. Those features can be tracked, and the relative motion of the feature in captured images can be used to improve position and orientation estimates of the munition. Each time a particular feature is seen in an image, the position of the feature and the position of the munition can be refined. The map may be defined in a global reference frame such as ECEF, or in a local inertial frame defined by the features in the map.

SLAM engine 260 outputs the initial SLAM data and the SLAM data as refined about the targets to target selection software module 270 and to datalink transmitter 222. [SLAM engine 260 can also process its input to refine the navigation solution (e.g., position, velocity and attitude) of the munition and can provide a refined navigation solution as feedback to navigation component 210 to aid navigation component in calculating the navigation solution.

Target selection module 270 receives the SLAM data about targets, which it can use for selecting and or pursuing a target, e.g., by sending target position data for a selected target to a guidance, navigation, and control (GNC) system for controlling pursuit of the target by the munition. Target information in the map can be used to select an optimal target for a coordinated engagement with the other munitions of the salvo.

There are also opportunities for the munitions to carry different hardware. For example, one or more munitions of the salvo can be equipped with a GPS. The other munitions can operate without a GPS receiver and without using GPS data. Accordingly the salvo can operate with or without GPS, including in a GPS-denied environment. One or more of the munitions can be equipped with additional sensor(s), such as a magnetometer, altimeter, air data sensor, terrain matching imagers, etc. The output from any of the sensors can be used, for example, to determine the navigation solution, e.g., by using a Kalman filter or similar filter.

With reference to FIGS. 3A and 3B, in scene 300, munitions 304, 306, 308 in a salvo 302 share their individual SLAM data with their navigation data, and optionally TWTR data using a data link. When munition 304 receives data link transmissions from the other munitions 306 and 308, munition 304 aligns its reference frame more closely with the reference frames described by the SLAM data of the other munitions.

Once large, distinguishable features come into view for each of munitions 304, 306, 308, SLAM algorithms are initially applied to these features. These large, distinguishable features are visible from longer ranges and can be, for example buildings (e.g., 310-1, 310-2, 310-3), road intersections, ponds, etc. The positions of and meta-data about features are shared with the other munitions and used to build a large initial map that can be shared with the other munitions 304, 306, 308, allowing each the munitions to begin correlating their reference frames as soon as features come into view for any of munitions 304, 306, 308. Each time one of munitions 304, 306, 308 adds a feature to its map as it travels and changes its FOV, the newly added feature's position and any meta data about the feature is shared with the other munitions 304, 306, 308.

When sharing positions, the positions can be expressed using the selected coordinate system. When the reference frame is a global reference frame, the positions are expressed, for example in X-Y-Z coordinates when using ECEF or in latitude and longitude when using geodetic coordinates. When the reference frame is a local reference frame, the positions are determined based on the relative position to chosen features, such as the origin and the alignment feature. Meta data can include, for example, feature type, and can be shared between munitions to improve target correlation.

The feature labels can be names, such as F1 and F2 and/or can describe a position relative to another feature, a type of the feature, and/or the type of the other feature, such as "the barn that is North East of the tall building (F1)."

As features are being added to their maps by detection or receiving SLAM data from other munitions 304, 306, and 308, each munition 304, 306, 308 can continue searching for targets (e.g., 312-1, 312-2, 312-3, 312-4, 312-5, 312-6) that come into their FOV.

Each time one of munitions 304, 306, 308 adds a target to its map as it travels and changes its FOV, the newly added target's position and any meta data about the target is shared with the other munitions 304, 306, 308. Meta data can include, for example, target type, target heading, direction of motion, and target speed, and can be shared between munitions to improve target correlation.

The target labels can be names, such as T1, T2, and T3 and/or can describe a position relative to a feature, a type of target, and/or the type of feature, such as "the tank target that is North West of the barn (F2)." In addition, all features and targets in the FOV are tracked as the munition travels.

FIG. 3A shows a first example scenario in which munitions 304, 306, 308 approach a planned target destination in sequence. Munitions 304, 306, 308 have the same FOV 320-1. Munition 304, which is in the front of salvo 302, creates a map using SLAM and relays the information via the data link to munitions 306 and 308 that follow behind munition 304 along a flight path towards a target destination. Munitions 306 and 308 use the map to synchronize their reference frames, thus sharing a same reference frame among munitions 304, 306, 308. Each of munitions 304, 306, and 308 can select a different target to engage and communicate their selected target to the other munitions 304, 306, 308.

FIG. 3B shows a second example scenario in which munitions 304, 306, 308 approach a planned target destination simultaneously. Munitions 304, 306, 308 have different respective FOVs 320-1, 320-2, 320-3. Munitions 304, 306, 308 build and share their individual maps at the same time and use the shared SLAM data to synchronize features in their individual maps, thus creating one common map used by munitions 304, 306, 308. As the feature locations are refined in each of these scenarios by munitions 304, 306, 308, covariance of the feature positions is reduced.

Figure 4:
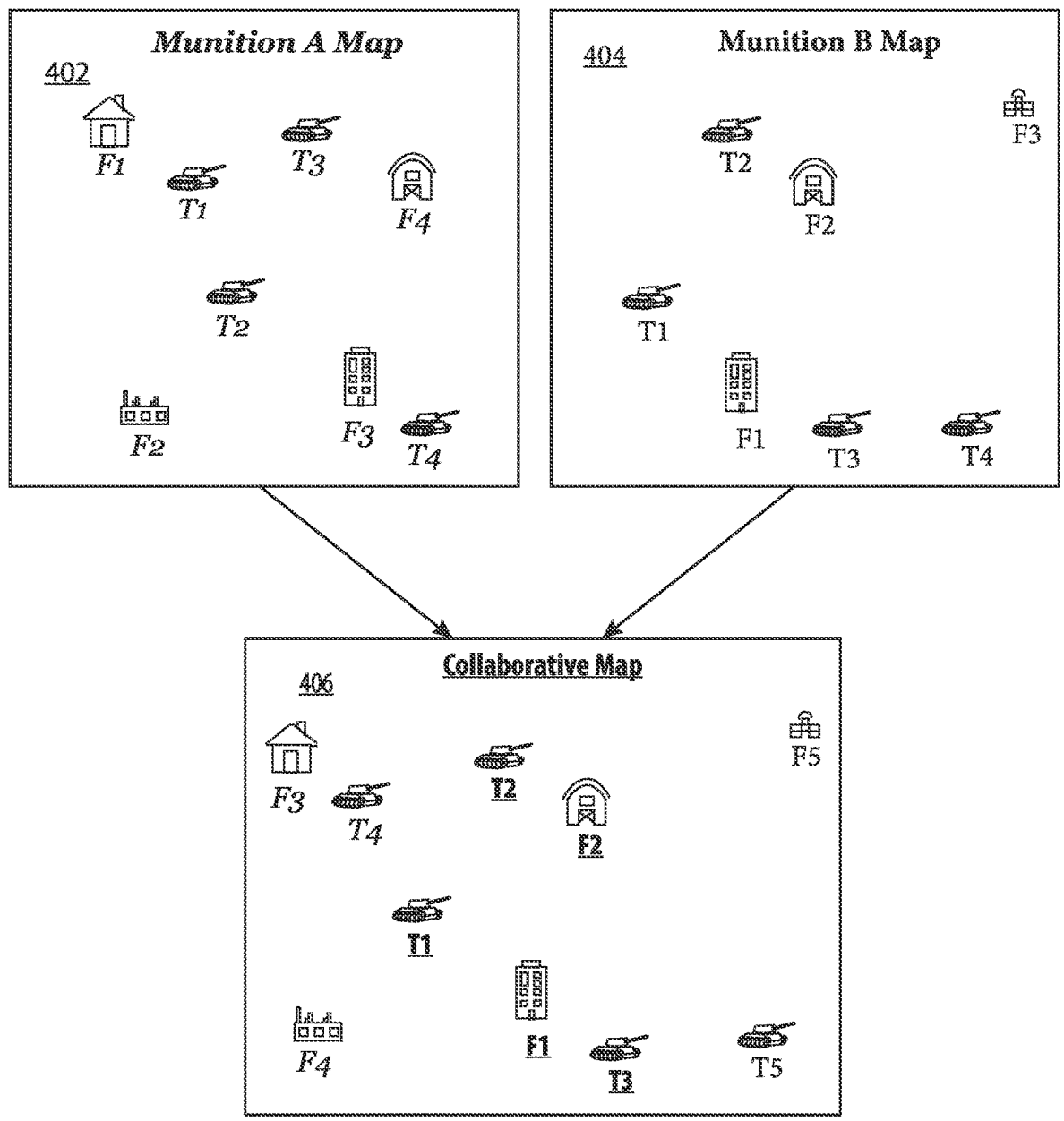
FIG. 4 illustrates combining of SLAM data by different munitions by sharing individual maps having SLAM data, in accordance with one or more embodiments of the disclosure.

With reference to FIG. 4, a first example initial map 402 is shown that was built by a first munition based on features and targets in the first munition's FOV. Map 402 includes SLAM data, including positions of features F1-F4 and targets labeled T1-T4. Before receiving SLAM data shared by the second munition, all of the features and targets in first initial map 402 are visible only to the first munition.

A second example initial map 404 is shown that was built by a second munition based on features and targets in the second munition's FOV. Second initial map 404 includes SLAM data, including positions of features F1-F3 and targets labeled T1-T4. Before receiving SLAM data shared by the second munition, all of the features and targets in second initial map 404 are visible only to the second munition, and the labels assigned do not correlate with the labels assigned to the features and targets in the first initial map 402 built by the first munition.

Each of the first and second munitions build a combined map 406 base on their own respective initial maps (first and second initial maps 402 and 404) and the initial maps 404 and 402 (second and first initial maps 404 and 402) shared by the other respective munitions via the data link. Targets labeled T1, T2, and T3 are visible to both the first and second munitions and have common labels that are shared via the data link. The target labels can be names, such as T1, T2, and T3 and/or can describe a position relative to a feature, a type of target, and/or the type of feature, such as "the tank target that is North West of the barn (F2)." Features F1 and F2 are visible to both the first and second munitions and have common labels that are shared via the data link. The feature labels can be names, such as F1 or F2 and/or can describe a position relative to another feature (which can be used to create a common reference frame), and/or a type of the feature, such as "the barn F1 that is North East of tall building (F1)."

As more munitions detect features or targets, the feature position or target position in the common reference frame becomes better defined. Independent estimates of the feature or target positions from different viewing angles by different munitions as they travel provides additional observability and can reduce covariance of the positions of features and targets in the common map. In addition, refined feature and target positions can be used to improve position and attitude information of the munitions that are tracking the features and targets using SLAM.

Additionally, target and feature meta data that is shared between munitions can be used to improve feature and target correlation. The meta data can be associated with mapped features and targets and used as a data validity check, and/or correlation of features and/or targets that have larger position covariance values. For example, an existing map feature can associated with a measured feature (e.g., from an image captured by the munition's seeker) if a difference between positions of the respective mapped and measured features falls within predetermined covariance bounds and the measured feature is distinguishable from other map features in order that the measured feature will not be paired with two different map features at once. In this way, each munition can build confidence in mapped features and targets, wherein the level of confidence can influence decisions made during the munition during its mission.

Figure 5:
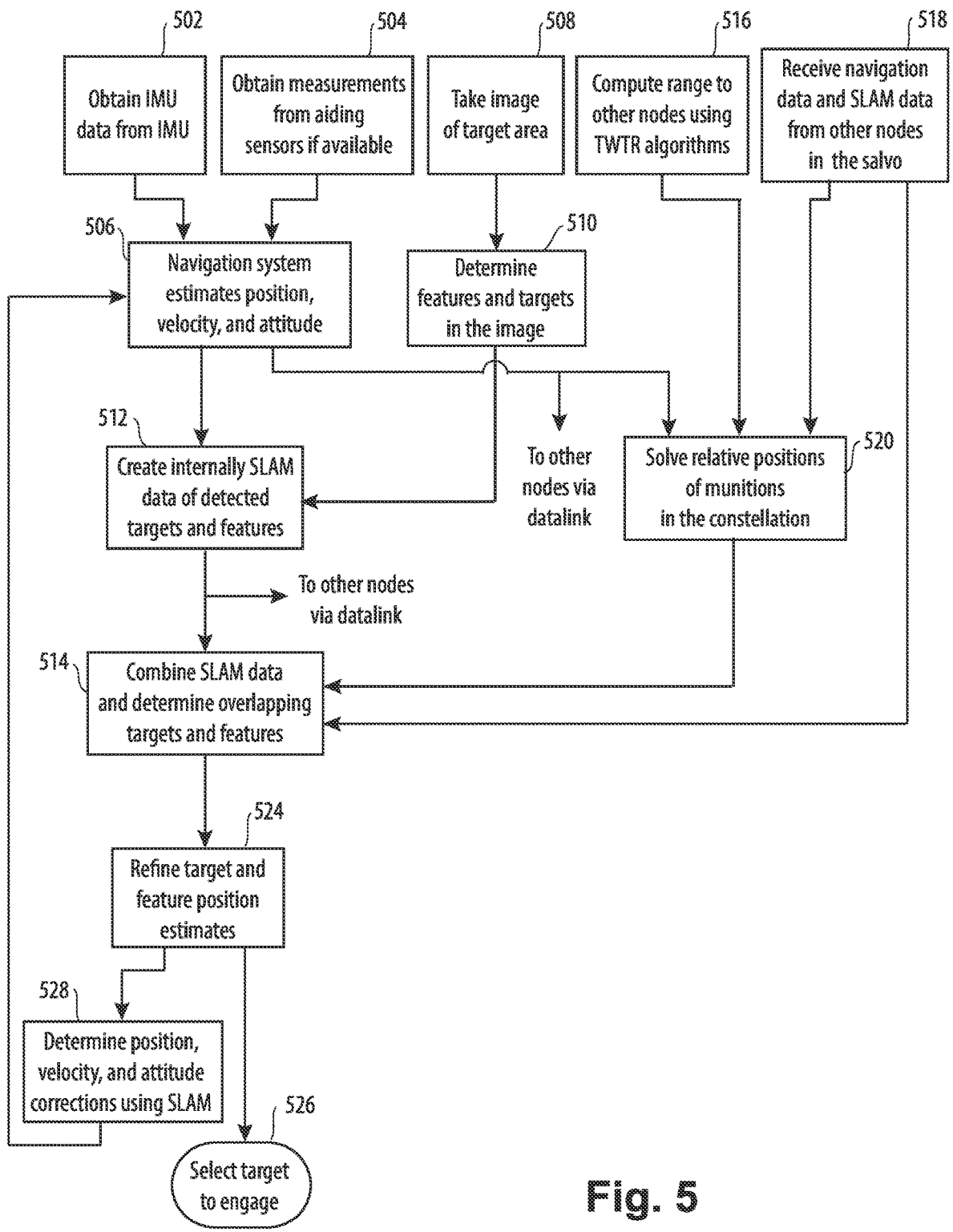
FIG. 5 is flowchart of an exemplary process for collaboration of a plurality of nodes travelling in a group to a target destination having one or more targets, in accordance with the illustrated embodiments.

With reference to FIG. 5, an exemplary and non-limiting flowchart 500 illustrates a method performed autonomously by a navigation system of each node in a traveling group of nodes, such as navigation system 120 shown in FIG. 2 in accordance with certain illustrated embodiments. The method can be performed by a navigation system of each node in a traveling group, such as navigation system 120 shown in FIGS. 2 and 3. Before turning to description of FIG. 5, it is noted that the flowchart in FIG. 5 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

At block 502, IMU data is obtained from an IMU device, such as an IMU device included with onboard aiding sensors 208 shown in FIG. 2. At block 504, measurements from other sensors potentially included with the onboard aiding sensors are obtained, such as measurements from a GPS, magnetometer, altimeter, air data sensor, terrain matching imagers, etc. At block 506, navigation data is estimated from the IMU data obtained at block 502 and measurements (if any) obtained at block 504. The navigation data is provided to block 512, is optionally provided to block 520, and is further output to the other nodes, of the group of nodes.

At block 508, images are captured of a target area to which the node is traveling. The images can be captured by an imager, e.g., of seeker 114 shown in FIG. 1. At block 510, objects, including features and targets, are recognized using automatic target recognition (ATR) algorithms for determining the object type, such as by seeker 114 or another imager device. The location of the objects in the image are determined and the objects are thus tracked in the images, e.g., by the seeker. At block 512, SLAM data is determined internally using SLAM algorithms, such as by SLAM engine 260 shown in FIG. 2. The SLAM data is provided to block 514 and is further output to the other nodes of the group of nodes. The SLAM engine creates a map in the desired (local or global) reference frame and then, once established, in a common reference frame once. SLAM data can be determined in any reference frame. Image data in a body frame (or imager frame if not aligned with the body frame) can be transformed into the desired frame of reference before being used for SLAM.

The map is a collection of feature points, which are features recognized at block 510 and plotted on the common reference frame. For example, the map can specify a first object (a feature) that is a house at position (x1,y1) and a second object (a target) that is a tank at position (x2,y2). The corresponding SLAM data includes the map as well as covariance data for each feature and target and any additional meta data (such as object orientation, velocity, etc.). The SLAM engine outputs SLAM data, which includes the map and covariance and metadata of each feature point.

Initially, before the common reference frame is established, the SLAM data can include initial SLAM data before collaborating with SLAM data from other nodes. The initial SLAM data is output when features are first recognized in the node's imager's FOV using a local reference frame. The internally determined SLAM data initially uses a local reference frame of the node. The initial SLAM data can be updated using the navigation data as the node travels, as different sets of features or targets are included in the node's imager's FOV.

Once SLAM data is obtained from other nodes in a group of nodes to which the node belongs (e.g., salvo 302 shown in FIGS. 3A and 3B, are received (e.g., at block 518 as described below), any internally determined or received SLAM data is translated to a common reference frame that is common to the nodes of the group of nodes. The translation to the common reference frame can be performed, for example, at block 512 or block 514. Internally determined SLAM data about the features and targets using the common reference frame are output from block 512 and provided to block 514.

At block 516, a range to the other nodes of the group of nodes, is determined. In one or more embodiments, the range can be determined using TWTR algorithms. At block 518, navigation data and SLAM data is received from other nodes of the group of nodes.

The output of blocks 516 and 518 is received at block 520 and the navigation data received at block 518 and the range to target determined at block 516 is used to solve relative positions of the nodes. In one or more embodiments, the relative positions of the nodes can be in accordance with constellation that has a predefined formation. In addition, block 520 can optionally use the node's navigation data determined at block 506 to determine the relative positions.

At block 514, a combinatorial process is used to combine the SLAM data output at block 512 and the SLAM data output put at block 522. The combinatorial process includes determining which features and targets are overlapping, meaning included in maps that correspond to SLAM data from different nodes. The combinatorial process establishes a common reference frame for the various nodes of the group of nodes and applies the feature and target that were detected to the common reference frame, generating one map that includes features and targets detected by the node as well as the other nodes in the group. Since each node is performing these same tasks, each node develops substantially the same map and uses substantially the same common reference frame.

The combinatorial process can include combining features/targets if they overlap on a map within a given threshold (based on the covariance of the associated measurements) and can be uniquely matched. For example, feature A1 cannot be paired with features B1 and B2. Conflicts can be flagged and attempted to be resolved during a next cycle. If unresolved, they can be treated as different objects (which can result in possible overkill of a high priority target) or ignored (which can result in a missed low priority target).

At block 524, feature and target position estimates are refined using the combined maps and common frame of reference for features and targets detected by the node and by the other nodes of the group. At block 528, navigation data for the node is updated using output from blocks 514 and/or 524.

Blocks 512, 514, 522, and 524 can be performed by SLAM engine 260 shown in FIG. 1. The order and division of tasks performed at blocks 512, 514, 522, and 524 is shown as an example, but is not limited to a particular order or division of tasks. For example, two or more of the tasks can be combined and performed together, or a portion of tasks performed by one block can be performed a different one of these blocks.

At block 526, when a proper time for preparation for target engagement has arrived, output from block 524 is provided to block 526, and is used to select and/or engage a target based on its refined position determined at block 524.

One or more of blocks 502-512 can be performed in parallel and/or simultaneously with blocks 516-522.

The various nodes of the group of nodes can be equipped with different sensors, e.g., of onboard aiding sensors 208 shown in FIG. 2. Measurement data obtained by a node having additional sensors relative to another node of the group can share its measurement data via the data link in order to aid the other nodes. For example, the more highly equipped nodes can share data that will aid the other nodes to raise their confidence in the output of blocks 514, 524, and/or 528. For example, since there are also opportunities for the nodes to carry different hardware, one node may be equipped, for example with a GPS which can help the other nodes, without a GPS receiver and without using GPS data, to have increased confidence in their output of blocks 514, 524, and/or 528.

However, even if none of the nodes are GPS capable or have access to GPS in their environment, the confidence of the output of blocks 514, 524, and/or 528 is enhanced by the collaborative sharing of SLAM data via the data link and using the shared SLAM data to combine maps and refine estimated positions of features and targets.

In accordance with the above description, potential benefits include 1) provision of a common reference frame for coordination of target selection and/or engagement, 2) sharing of a map built by a first node being shared with a second node to share prior knowledge of the first node's environment with the second node before the first node's environment is in the FOV of the second node, 3) shared information by a first node with a second node about target locations and target meta data can reduce a search space of the second node for a given target and can increase target sets available to be assigned to the second node for engagement in a collaborative manner. Since the sharing can be bi-directional, both the first and second nodes, and potentially all nodes in a group, are able to aid one another and collaborate.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for collaboration of a plurality of nodes travelling in a group to a target destination having one or more targets, wherein each node of the plurality of nodes is provided with a datalink communication system to communicate with other nodes of the plurality of nodes, the method comprising:
   determining at each node (Simultaneous Localization and Mapping) SLAM data for the node, the SLAM data including estimated position of features or targets observed by the node and processed by the node using SLAM algorithms and covariance associated with the estimated positions;
   communicating at each node the node's SLAM data to the other nodes via each nodes' datalink communication system;
   receiving at each node SLAM data communicated from the other nodes via each node's datalink communication system;
   combining at each node the node's SLAM data and the SLAM data received from the other nodes based on one or more features or targets included in SLAM data from two or more nodes of the other nodes;
   refining at each node estimated positions of features or targets based on results of the combining; and
   navigating each node to a target at the target destination as a function of at least one of the refined estimated positions.

2. The method of claim 1, wherein combining at each node the node's own SLAM data and the SLAM data received from the other nodes includes determining one or more features or targets for which positions are included in the node's SLAM data are the same one or more features or targets for which positions are included in the received SLAM data.

3. The method of claim 1, wherein the SLAM data determined at each node further include meta data about the features or targets for which estimated positions are included, wherein the meta data includes at least one of a feature type, target type, target heading, direction of motion, and target speed.

4. The method of claim 1, further comprising:
   capturing at each node one or more images;
   recognizing at each node one or more features or targets in the images; and
   tracking at each node the recognized one or more features or targets, wherein the node's SLAM data is based on the tracked one or more features or targets.

5. The method of claim 1, wherein when traveling in a constellation a first and second node of the plurality of nodes determine their respective SLAM data substantially simultaneously followed by receiving each other's respective SLAM data, or wherein when traveling in the constellation the first node determines its SLAM data and the first node provides the first node's SLAM data to the second node before the second node determines the second node's SLAM data.

6. The method of claim 1, wherein the plurality of nodes are a plurality of munitions in a salvo discharged to attack one or more targets.

7. The method of claim 6, wherein each munition of the plurality of munitions in the salvo is selected from the group consisting of: gun launched munitions; rocket propelled munitions; motor propelled munitions; air dropped munitions; and Unmanned Aerial Vehicles.

8. The method of claim 1, wherein for each of the nodes the SLAM data is determined independent of a Global Positioning System (GPS).

9. The method of claim 1, further comprising:
   communicating at each node navigation data of the node to the other nodes via each nodes' datalink communication system;
   receiving at each node navigation data communicated from the other nodes via each node's datalink communication system; and
   determining at each node the distance range of the node relative to the other nodes is further performed using the navigation data communicated from the other nodes.

10. The method of claim 1 further comprising each node updating the node's SLAM data using navigation data of the node as the node travels.

11. A navigation system for a node providing collaboration of a plurality of nodes travelling in a group to a target destination having one or more targets, comprising:
    a datalink communication system configured and operable to communicate with other nodes of the plurality of nodes;
    a navigation component for navigating the node in travel;
    a memory configured to store instructions;
    a processor disposed in communication with the memory, wherein the processor upon execution of the instructions is configured to:
        determine (Simultaneous Localization and Mapping) SLAM data for the node, the SLAM data including estimated position of features or targets observed by the node and processed by the node using SLAM algorithms and covariance associated with the estimated positions;
        communicate the node's SLAM data to the other nodes via the nodes' datalink communication system;
        receive SLAM data communicated from the other nodes via the other nodes' datalink communication systems;
        combine the node's SLAM data and the SLAM data received from the other nodes based on one or more features or targets included in SLAM data from two or more nodes of the other nodes;
        refine estimated positions of features or targets based on results of the combining; and
        navigate the node to a target at the target destination as a function of at least one of the refined estimated positions.

12. The navigation system of claim 11, wherein combining the node's SLAM data and the SLAM data received from the other nodes includes determining one or more features or targets for which positions are included in the node's SLAM data are the same one or more features or targets for which positions are included in the received SLAM data.

13. The navigation system of claim 11, wherein the SLAM data determined further includes meta data about the features or targets for which estimated positions are included, wherein the meta data includes at least one of a feature type, target type, target heading, direction of motion, and target speed.

14. The navigation system of claim 11, wherein the processor upon execution of the instructions is further configured to:
   capture one or more images;
   recognize one or more features or targets in the images; and
   track the recognized one or more features or targets, wherein the node's SLAM data is based on the tracked one or more features or targets.

15. The navigation system of claim 11, wherein the plurality of nodes are a plurality of munitions in a salvo discharged to attack one or more targets.

16. The navigation system of claim 15, wherein each munition of the plurality of munitions in the salvo is selected from the group consisting of: gun launched munitions; rocket propelled munitions; motor propelled munitions; air dropped munitions; and Unmanned Aerial Vehicles.

17. The navigation system of claim 11, wherein the SLAM data is determined independent of a Global Positioning System (GPS).

18. The navigation system of claim 11, wherein the processor upon execution of the instructions is further configured to:
   communicate navigation data of the node to the other nodes via the node's datalink communication system;
   receive at the node's datalink communication system navigation data communicated from the other nodes via the other nodes' datalink communication systems; and
   determine the distance range of the node relative to the other nodes is performed using the navigation data communicated from the other nodes.

19. The navigation system of claim 11 wherein the processor upon execution of the instructions is further configured to: update the node's SLAM data using navigation data of the node as the node travels.

* * * * *